United States Patent
Draganic

(10) Patent No.: US 7,383,549 B1
(45) Date of Patent: *Jun. 3, 2008

(54) PROCESSOR SHARING TECHNIQUE FOR COMMUNICATIONS AND OTHER DATA PROCESSING ON A SAME PROCESSOR

(75) Inventor: Zarko Draganic, Belvedere, CA (US)

(73) Assignee: Broadcom Corporation, Irvine, CA (US)

( * ) Notice: Subject to any disclaimer, the term of this patent is extended or adjusted under 35 U.S.C. 154(b) by 666 days.

This patent is subject to a terminal disclaimer.

(21) Appl. No.: 10/889,611

(22) Filed: Jul. 12, 2004

Related U.S. Application Data

(63) Continuation of application No. 09/448,649, filed on Nov. 24, 1999, now Pat. No. 6,766,516, which is a continuation of application No. 08/780,611, filed on Jan. 8, 1997, now Pat. No. 5,995,540.

(51) Int. Cl.
| | |
|---|---|
| *G06F 9/46* | (2006.01) |
| *G06F 3/00* | (2006.01) |
| *G06F 11/00* | (2006.01) |
| *G06F 19/00* | (2006.01) |
| *H04B 1/38* | (2006.01) |

(52) U.S. Cl. ............... 719/310; 710/8; 710/14; 710/20; 710/62; 714/25; 714/30; 714/43; 714/44; 702/117; 702/122; 375/219; 375/222

(58) Field of Classification Search ........ 709/200–253; 370/200–546; 340/2.1–999; 379/1.01–457; 719/310; 718/100–108; 710/8, 14, 20, 62; 714/25, 30, 43, 44; 375/219–222; 702/117, 702/122

See application file for complete search history.

(56) References Cited

U.S. PATENT DOCUMENTS

| | | | |
|---|---|---|---|
| 4,029,912 A | | 6/1977 | Geigel et al. |
| 4,085,449 A | | 4/1978 | Walsh et al. |
| 4,399,563 A | | 8/1983 | Greenberg |
| 4,943,942 A | | 7/1990 | Dunnion |
| 4,951,309 A | * | 8/1990 | Gross et al. ........... 379/102.04 |
| 4,964,120 A | | 10/1990 | Mostashari |
| 4,965,641 A | | 10/1990 | Blackwell et al. |
| 4,996,706 A | * | 2/1991 | Cho .................. 379/102.04 |
| 5,170,470 A | | 12/1992 | Pindar et al. |
| 5,404,544 A | * | 4/1995 | Crayford ................ 713/310 |
| 5,491,721 A | | 2/1996 | Cornelius et al. |
| 5,619,531 A | * | 4/1997 | Taylor et al. ............... 375/222 |
| 5,619,650 A | * | 4/1997 | Bach et al. ................ 709/246 |

(Continued)

OTHER PUBLICATIONS

Huard, Jean-Francois. "kStack: A User Space Native-Mode ATM Trasport Layer with QOS Support." Oct. 28, 1996.*

(Continued)

*Primary Examiner*—Meng-Ai An
*Assistant Examiner*—Jennifer N To

(57) ABSTRACT

The computational load imposed by communications software executed on a general purpose processor can be significantly reduced by exploiting periods during an active connection when no data is being received. In particular, execution of many receive path signal processing algorithms can be disabled when no data is being received. The transmit path continues output modulation as with a normal connection, so as to trick a remote communications device into believing the connection is still normal. However, substantial portions of the local receive path can be disabled, thereby reducing computational load on the general purpose processor and freeing additional compute cycles for application and/or operating system program use.

31 Claims, 5 Drawing Sheets

U.S. PATENT DOCUMENTS

| | | | |
|---|---|---|---|
| 5,625,678 A * | 4/1997 | Blomfield-Brown | 379/93.08 |
| 5,631,952 A | 5/1997 | O'Barr et al. | |
| 5,649,122 A * | 7/1997 | Wegner et al. | 710/105 |
| 5,652,866 A | 7/1997 | Aldred et al. | |
| 5,682,417 A * | 10/1997 | Nitta | 455/560 |
| 5,764,693 A | 6/1998 | Taylor et al. | |
| 5,790,941 A | 8/1998 | Peponides | |
| 5,790,946 A * | 8/1998 | Rotzoll | 455/343.1 |
| 5,806,007 A | 9/1998 | Raith et al. | |
| 5,822,689 A | 10/1998 | Hwang | |
| 5,946,304 A * | 8/1999 | Chapman et al. | 370/276 |
| 5,982,814 A | 11/1999 | Yeh et al. | |
| 5,995,540 A | 11/1999 | Draganic | |
| 5,999,526 A | 12/1999 | Garland et al. | |
| 6,112,269 A * | 8/2000 | Nordling | 710/69 |
| 6,230,277 B1 * | 5/2001 | Nakaoka et al. | 713/320 |
| 6,333,974 B1 | 12/2001 | Liang et al. | |
| 7,210,146 B2 * | 4/2007 | Hsieh | 718/103 |

OTHER PUBLICATIONS

ITU-T Recommendation V.34, "A Modem Operating at Data Signaling Rates of up to 28 800 bits/s for Use on the General Switched Telephone Network and on Leased Point-to-Point 2-Wire Telephone-Type Circuits", Sep. 1994 (previously CCITT Recommendation).

ITU-T Draft Recommendation G.992.2, Transmission Systems and Media, "Splitterless Asymmetric Digital Subscriber Line (ADSL) Transceivers", International Telecommunication Union, Feb. 17, 1999 (p. 3-153).

* cited by examiner

PROCESSOR SHARING TECHNIQUE FOR COMMUNICATIONS AND OTHER DATA PROCESSING ON A SAME PROCESSOR

CROSS-REFERENCE TO RELATED APPLICATION(S)

This patent application is a continuation of co-pending U.S. patent application Ser. No. 09/448,649, filed on Nov. 24, 1999, naming as the sole inventor Zarko Draganic, which is itself a continuation of U.S. application Ser. No. 08/780,611, filed on Jan. 8, 1997, now known as U.S. Pat. No. 5,995,540.

BACKGROUND OF THE INVENTION

1. Field of the Invention

This invention relates to modems, and in particular to systems and methods for reducing the processing requirements of a modem.

2. Description of the Related Art

Modems are communications devices which employ digital modulation techniques to transmit binary data over analog communications channels, e.g., telephone lines. Typically, two modems communicate over a single channel, with one modem at each end of the channel. Signal processing structures implemented at each modem provide encoding, modulation, filtering, interpolation, echo cancellation, signal detection, equalization, demodulation, and decoding functionality. Modems typically conform to international standards to ensure interoperability with modems from other manufacturers. One such standard is the V.34 specification described in ITU-T Recommendation V.34, *A Modem Operating at Data Signalling Rates of up to 28 800 bits/s for Use on the General Switched Telephone Network and on Leased Point-to-Point 2-Wire Telephone-Type Circuits*, dated September, 1994 (previously CCITT Recommendation V.34), which is hereby incorporated herein, in its entirety, by reference.

Traditional modem implementations include one or more dedicated digital signal processors (or DSPs) on which signal processing algorithms execute during periods of modem operations. A computer system may incorporate such a modem implementation, and in addition, typically includes application and operating system software executable on a general purpose processor (e.g., any of a variety of processors including MIPS™ R3000, R4000, and RS000 processors, processors conforming to the SPARC™, PowerPC™, Alpha™, PA-RISC™, or x86 processor architectures, etc.). Software executing on the general purpose processor sends and receives data via the modem implementation using input/output (I/O) ports, direct memory access (DMA), or other I/O structures and methods suitable for a particular general purpose processor and operating system combination.

Since a typical modem implementation includes a dedicated DSP not shared with other signal processing functions of a larger computer system, the modem's DSP and the signal processing algorithms designed to run thereon are selected and designed to meet the peak computation load of the modem. DSP cycles are either used or lost. For this reason, signal processing algorithms implementing the complete steady-state functionality of modem transmit and receive paths are typically executed on a DSP at full speed for the duration of a modem connection.

For many portable device applications such as Personal Digital Assistants (PDAs), portable computers, and cellular phones, power consumption, battery life, and overall mass are important design figures of merit. In addition, very small part counts are desirable for extremely-small, low-cost consumer devices. Modem communications are desirable in many such portable device applications. However, traditional DSP implementations of the underlying signal processing capabilities create power substantial demands, require increased part counts, and because of the power consumption of a discrete DSP, typically require larger heavier batteries.

A modem implemented as software executable on a general purpose computer could reduce part counts, power demands, and overall mass of a computer system by eliminating the DSP, its power consumption, and some of the battery capacity otherwise required. However, to fully benefit from the elimination of a DSP, such a software modem needs to co-exist with existing operating systems and applications, running on the same general purpose processor as the operating systems and applications. Unfortunately, in a computer system which includes such a software modem, the load on the general purpose processor can be significant, slowing operating system and application programs, even when the software modem is not sending or receiving data. For example, FIG. 1 depicts a 14 MIPS steady-state computational load, which is exemplary of a software implementation of a traditional modem maintaining an active connection with both transmitter and receiver structures active for the duration of the connection.

SUMMARY OF THE INVENTION

The computational load imposed by communications software executed on a processor can be significantly reduced by exploiting periods during an active connection when no data is being received. In particular, execution of many receive path signal processing algorithms can be disabled when no data is being received. The transmit path continues output modulation as with a normal connection so as to trick a remote communications device into believing the connection is still normal. However, because substantial portions of the local receive path can be disabled, computational load on the processor is reduced and additional compute cycles are freed for application and/or operating system program use.

Disabled portions of the receive path are re-enabled (restarted) in response to wake up events. For example, receive path algorithms can be re-enabled under program control, e.g., when the user, application program, or operating system initiates data transmission, such as in response to a user selection of a new Universal Resource Locator (URL) within a World-Wide Web (WWW) browser application. Because many network-based applications, e.g., browsers, electronic mail clients and servers, message retrieval clients, netcasting receivers, etc., exploit a transaction-based model of interprocess communication, receive path algorithms can be enabled coincident with the start of such a transaction and disabled coincident with completion of the transaction. Receive path algorithms can also be periodically re-enabled, e.g., at programmable intervals. In this way, the receive path is periodically available for retransmission of data missed while the receive path algorithms were disabled (i.e., while the receiver was "asleep," or in "doze" mode). Higher level data protocols (e.g., TCP/IP) will retransmit any data that was missed while the receiver was "asleep."

In addition to program controlled and periodic wake up events, wake up events may be triggered by the remote communications device. For example, in a modem embodiment in accordance with ITU-T Recommendation V.34, remote retrain, remote rate renegotiation, and remote cleardown requests are received by an undisabled set of receive path signal processing algorithms. A wake up event is triggered in response to detection of a remote retrain, remote rate renegotiation, or remote cleardown request and disabled portions of the local modem's receive path are re-enabled in response thereto.

By providing functionality (e.g., in the form of functions, procedures, and/or methods) for enabling and disabling portions of a software modem's receive path algorithms, a software modem application program interface (API) in accordance with an embodiment of the present invention allows application and operating system processes to switch between a doze mode (with low computational load) during idle receive time and a full operational mode (with full computational load) during active receive time. In this way, compute cycles otherwise allocated to idle-time execution of receive path algorithms are allocable to application program or operating system processes. In an exemplary implementation, computational requirements for the software modem can be reduced from 100% in steady-state, to less than 25% of the steady state load during idle receive time, i.e., when no data is being received by the software modem. In contrast, traditional approaches requires the full 100% whether or not the software modem is receiving data.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
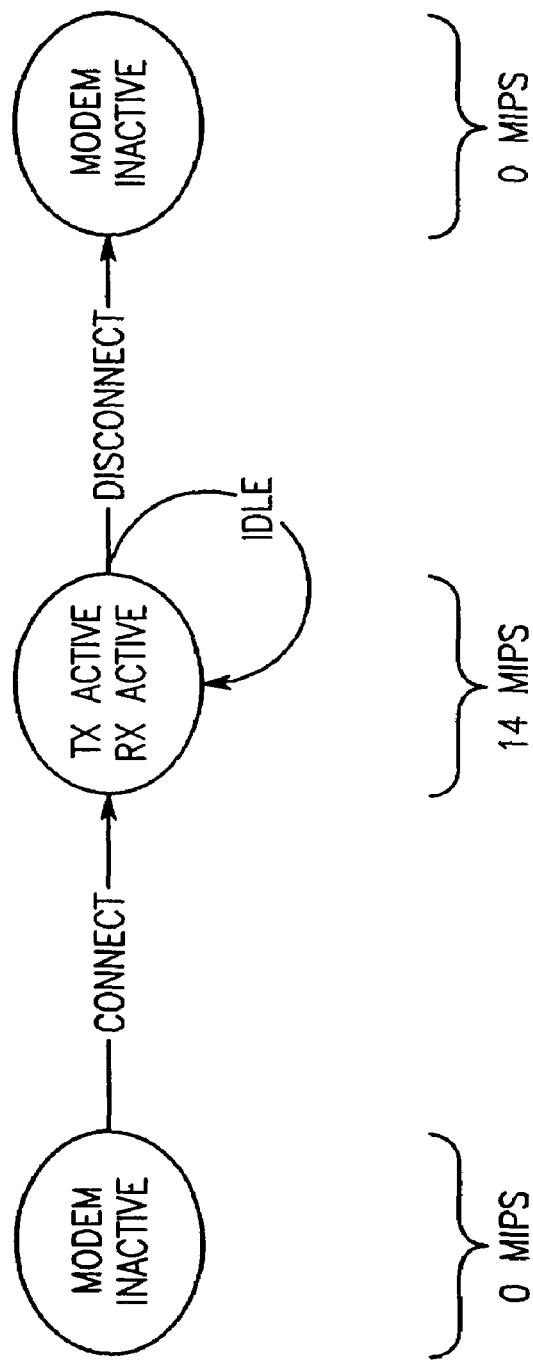
FIG. 1 is a state transition diagram depicting illustrative transitions and associated computational loads for a traditional hardware modem or software modem.
Figure 2:
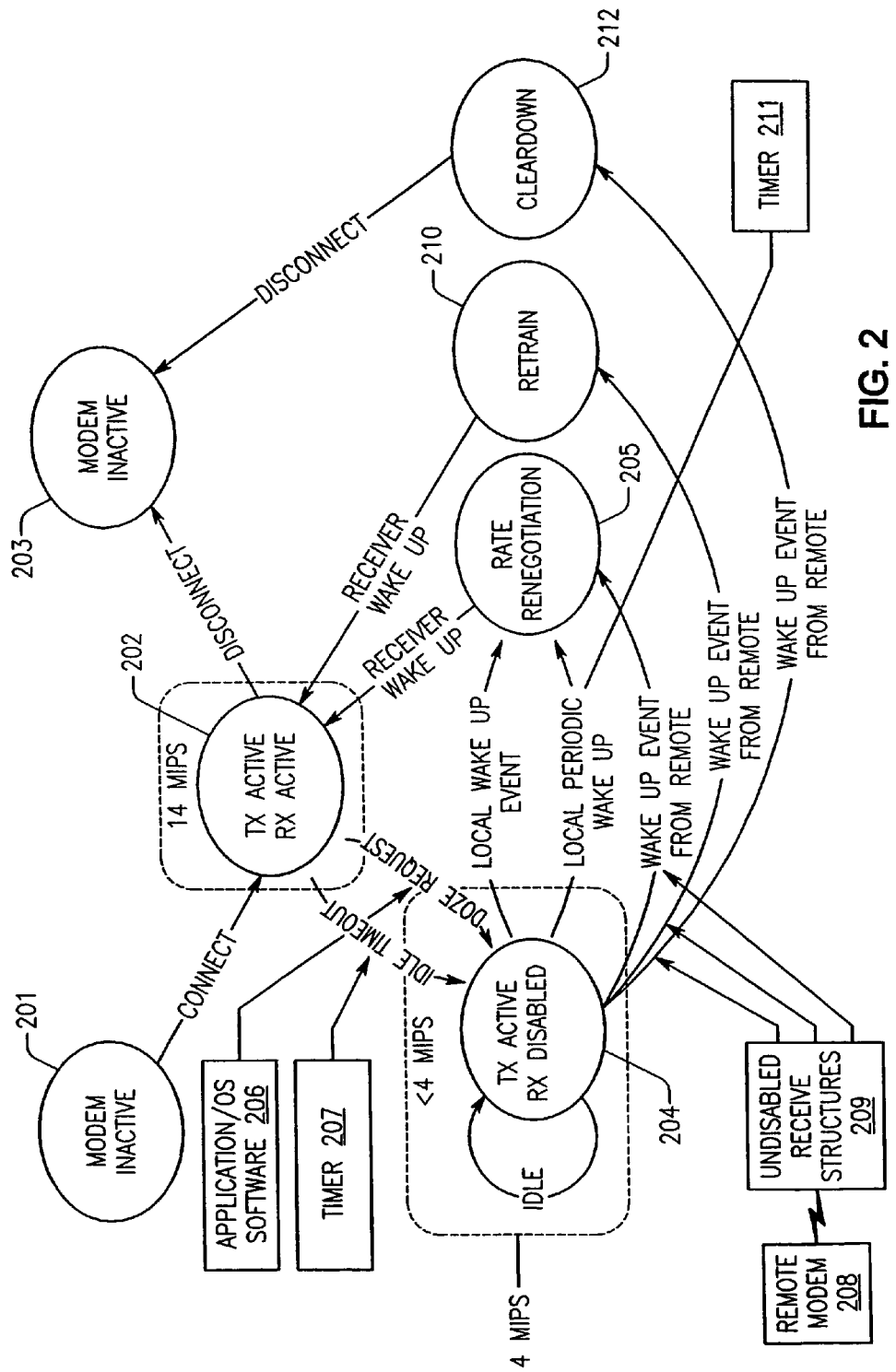
FIG. 2 is a state transition diagram depicting illustrative transitions and associated computational loads for a software modem providing reduced processing requirements during idle receive time in accordance with an exemplary embodiment of the present invention.

FIG. 2 depicts modem operating state transitions for an exemplary modem. Upon connection (with a second remote modem), the modem transitions from inactive state 201 to a steady state communications state 202 during which transmit and receive path structures of the modem are active. Steady state communications impose a significant computational load, illustratively 14 MIPS, which in an embodiment of the modem as software executable on a general purpose processor, depletes the number of general purpose processor cycles available for application and operating system software. On disconnect, the modem transitions from steady state communications state 202 to inactive state 203.

A reduction in processing requirements during idle receive time is provided as follows. On either a doze request or idle timeout event, the modem transitions from steady state communications state 202 to a doze state 204 during which transmit structures of the modem are active, but during which a substantial portion of receive path structures are disabled. Particular receive path structures disabled and those which remain enabled are described below with reference to FIGS. 3 and 4. A doze request may be triggered by software (e.g., application or operating system program 206) interacting with the modem, for example, by a browser application which has successfully received (or downloaded) the data associated with a user selected universal resource locator (URL). Alternatively, software associated with an application, an operating system, or an application program interface (API) for the modem itself, may monitor modem receive activity and trigger an idle timeout transition to doze state 204 after a timeout interval. Illustratively, FIG. 2 depicts an idle timeout triggered by timer 207. Alternative modem embodiments may support either or both of the doze request and idle timeout transitions from steady state communications state 202 to doze state 204.

Once in doze state 204, the modem imposes a substantially reduced computational load, illustratively, less than 4 MIPS. The modem remains in doze state 204 until a wake up event occurs. Such a wake up event can be generated locally or received from the remote modem. Regarding locally generated wake up events, doze state 204 can be exited under program control, e.g., coincident with a send_data ( ) call by application or operating system program 206, such as in response to a user selection of a new Universal Resource Locator (URL) within a World-Wide Web (WWW) browser application. Because many network-based applications, e.g., browsers, electronic mail clients and servers, message retrieval clients, netcasting receivers, etc., exploit a transaction-based model of interprocess communication, the modem transitions under program control from doze state 204 to rate renegotiation state 205 coincident with the start of such a transaction and transitions to doze state 204 coincident with completion of the transaction. In this way, receive path structures can be enabled coincident with the start of such a transaction and disabled coincident with completion of the transaction.

In addition to a locally-generated, application-triggered wake up event, the modem also transitions from doze state 204 to rate renegotiation state 205 in response to a periodic wake up event generated by timer 211. In this way, receive path structures are periodically re-enabled, e.g., at programmable intervals. Because data missed while portions of the receive path were disabled (i.e., while the software modem receiver was in doze state 204) will be re-sent by higher level data protocols (e.g., protocols above the physical, or modulation, layer that guarantee in-order, error-free delivery such as TCP/IP, the Appletalk® protocol, IPX dialup, ZMODEM, etc.), periodic re-enabling of the receive path structures allows for receipt of previously-missed data when re-sent by the higher level data protocols (and therefore retransmitted by the remote modem). Suitable wake-up intervals will be protocol specific; however, a typical wake-up interval (and corresponding period of reduced computational load) is approximately 10 seconds. Alternative embodiments, such as a modem embodiment which does not perform an idle timeout transition from steady state communications state 202 to doze state 204, may eliminate the periodic wake up if the protocols used by a particular instance of application or operating system program 206, e.g., post office protocol (POP3) used by an electronic mail client, hypertext transfer protocol (HTTP) used by a browser application, etc., are polling or request/response-type protocols, assuming that other layers of the protocol stack (e.g., link-layer protocols) do not require wake-up.

Wake up events can also be generated in response to transmissions from the remote modem. Although a substantial portion of receive path structures are disabled in doze state 204, an undisabled set of receive-path structures 209 remain enabled during doze state 204 (see description below in the context of FIGS. 3 and 4) so as to detect requests from the remote modem. In an exemplary V.34 embodiment, undisabled set of receive-path structures 209 allows the modem to detect remote retrain, remote rate renegotiation, and remote cleardown requests from remote modem 208 as described in ITU-T Recommendation V.34, *A Modem Operating at Data Signalling Rates of up to 28 800 bits/s for Use on the General Switched Telephone Network and on Leased Point-to-Point 2-Wire Telephone-Type Circuits*, dated September, 1994 (hereafter ITU-T Recommendation V.34) §§ 11.5-11.7 of which are incorporated herein by reference. In response to such detections, a remote wake up event is triggered and the modem transitions from doze state 204 to corresponding rate renegotiation, retrain, and clear down states 205, 210 and 212.

In an exemplary V.34 embodiment, rate renegotiation is used to "wake-up" the receiver. Whether the modem is "waked-up" from doze state 204 in response to a locally-generated, application-triggered wake up event, in response to a periodic wake up event generated by timer 207, or in response to a remote rate renegotiation wake up event, rate renegotiation is performed at rate renegotiation state 205 in accordance with the requirements of ITU-T Recommendation V.34, § 11.6 of which is incorporated herein by reference. Thereafter, the modem transitions from rate renegotiation state 205 back to steady state communications state 202 with re-enabled receive path structures. Rate renegotiation serves to retrain receive path structures, particularly demodulator far-end phase locked loop structures, if any, which have become stale since the modem's transition to doze state 204. Alternative embodiments may perform resynchronization, e.g., data driven reacquisition, instead of rate renegotiation in response to a locally-generated, application-triggered wake up event (e.g., from application or operating system program 206) or in response to a periodic wake up event generated by timer 207.

Retrain event handling is analogous. Retraining is performed at retrain state 210 in accordance with the requirements of ITU-T Recommendation V.34, § 11.5 of which is incorporated herein by reference. Thereafter, the modem transitions from retrain state 210 back to steady state communications state 202 with re-enabled receive path structures. Rate renegotiation serves to retrain receive path structures, particularly demodulator far-end phase locked loop structures, if any, which have become stale since the modem's transition to doze state 204.

Figure 3:
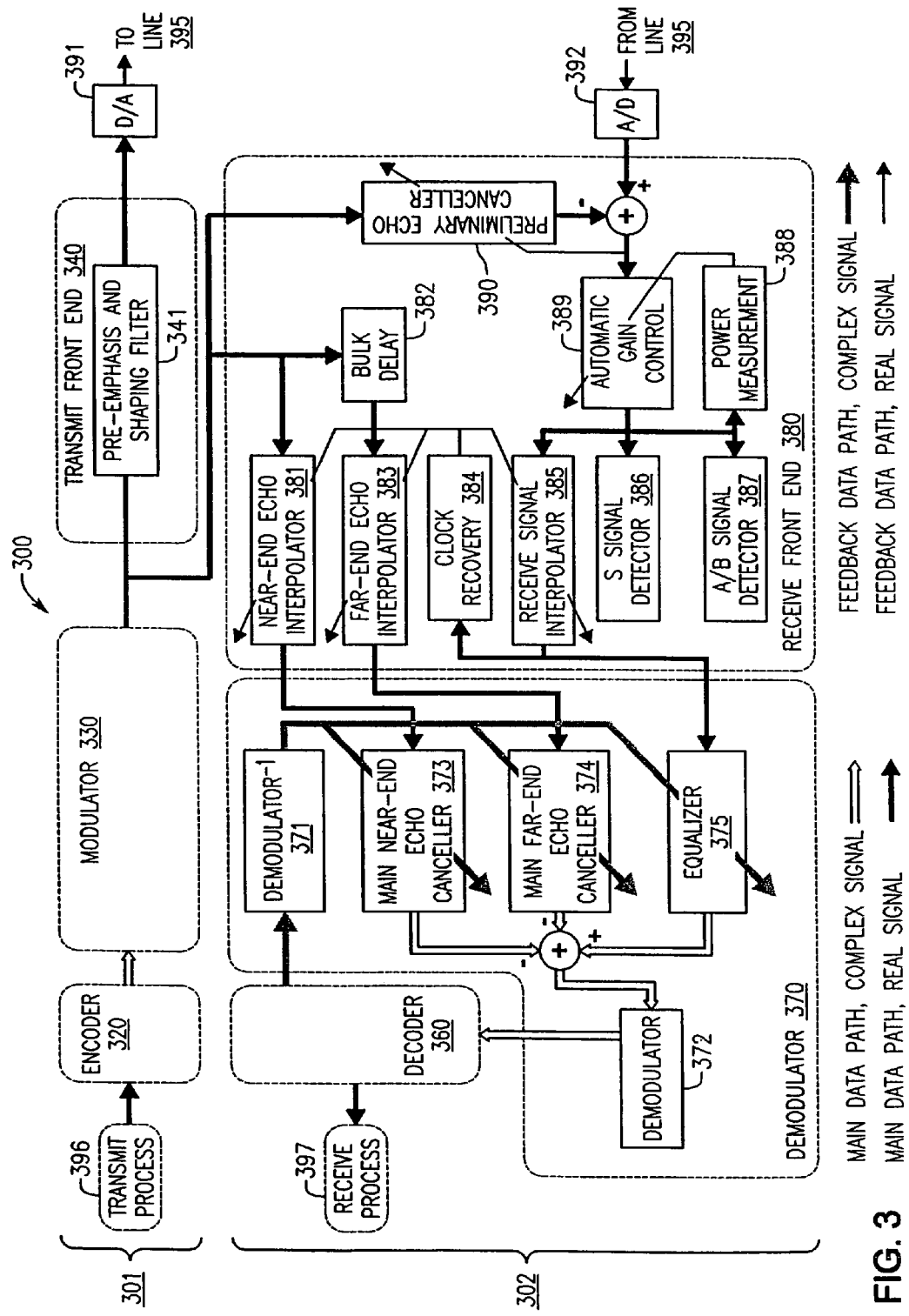
FIG. 3 is a block diagram depicting functional modules and data flows for an illustrative embodiment of a modem in accordance with an exemplary embodiment of the present invention.
Figure 4:
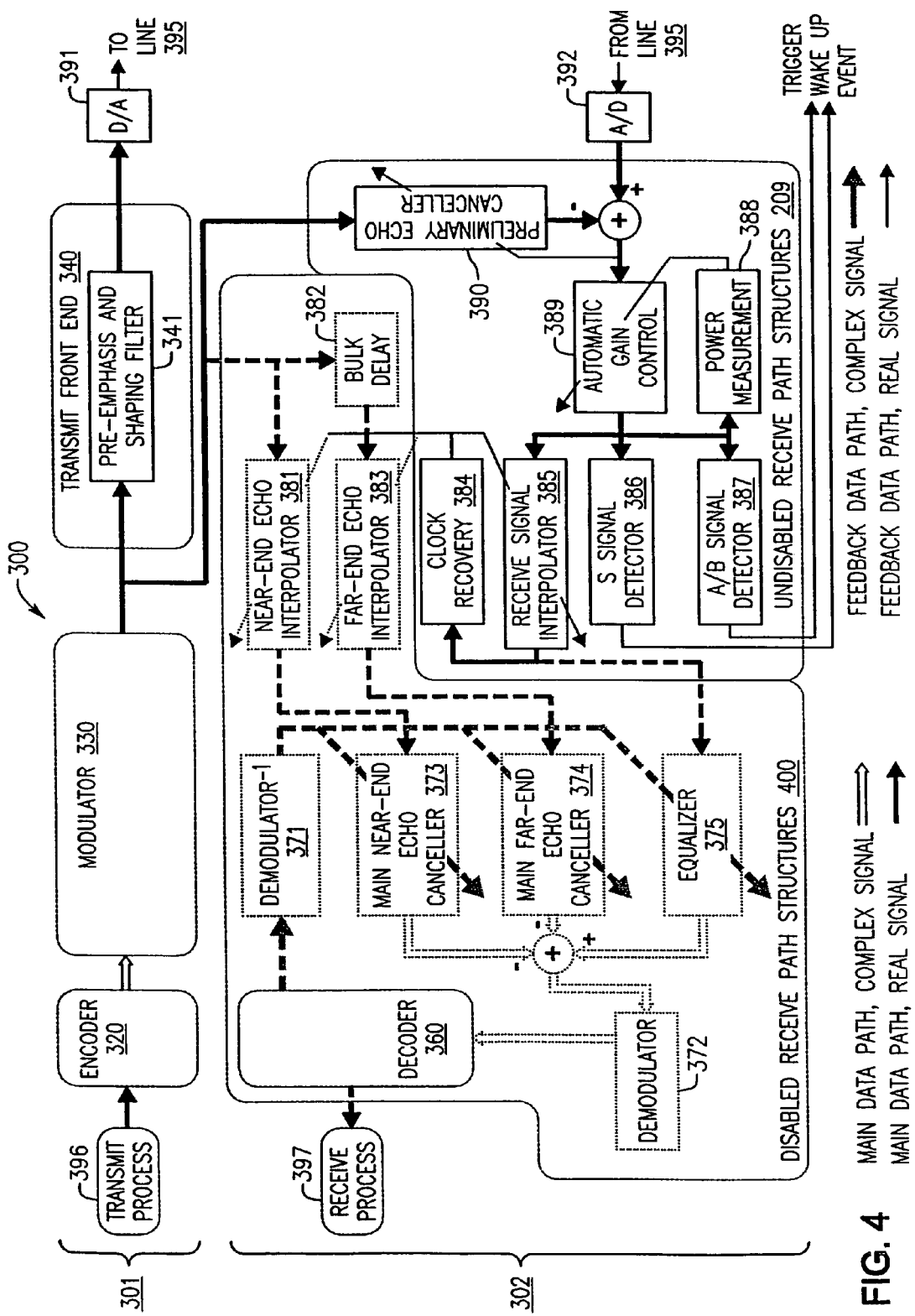
FIG. 4 is a block diagram depicting functional modules and data flows for the modem of FIG. 3, wherein an illustrative portion of the receive path structures thereof are disabled for reduction of processing requirements during idle receive time in accordance with an exemplary embodiment of the present invention.

FIGS. 3 and 4 depict transmit path structures 301 and receive path structures 302 for an exemplary V.34 modem 300 embodiment. Transmit path structures 301 and receive path structures 302 include fixed and adaptive filter implementations and other signal processing structures for modulation and demodulation of signals in accordance with the signaling requirements of ITU-T Recommendation V.34. In the exemplary embodiment of FIGS. 3 and 4, filter implementations and other signal processing structures are implemented as software executable on a general purpose processor and enabling and disabling of portions of the receive path is accomplished in software. Persons of ordinary skill in the art will recognize a wide variety of methods for predicating execution of receive path code on modem state. FIG. 3 depicts receive path structures 302 in accordance with steady state communications state 202, while FIG. 4 depicts receive path structures 302 in accordance with doze state 204 (including disabled receive path structures 400).

Transmit path structures 301 include encoder 320, modulator 330, and pre-emphasis and shaping filter 341. Receive path structures 302 include, decoder 360, demodulation and channel impairment compensation module 370, and receive front end module 380. Although the structures of FIGS. 3 and 4 may be suitably implemented in custom circuitry, using a programmed custom (or commercially-available) DSP, as software executable on a general purpose processor, or as any combination of the above, and although doze state 204 can be provided in any of such implementations, the freeing (during doze state 204) of general purpose processor cycles for use by application and/or operating system software is an advantage of an embodiment of V.34 modem 300 primarily or entirely implemented as software executable on a general purpose processor.

Persons of ordinary skill in the art will recognize a variety of suitable software implementations for structures along transmit and receive data paths, including algorithms for both performing the signal processing functions defined by the structures and for adaptively updating the structure definitions, e.g., by adaptively updating filter coefficients. The particular structures depicted in FIGS. 3 and 4 are merely illustrative of an exemplary set of suitable implementations. Alternative embodiments may incorporate transmit and receive path structures of any suitable design and persons of ordinary skill in the art will recognize suitable sets of receive path structures for enabling and disabling as now described with reference to the exemplary embodiment of V.34 modem 300.

Referring now to the receive data path of V.34 modem 300, receive path structures 302 (i.e., software implementations thereof) for receive front end module 380, demodulation and channel impairment compensation module 370, and decoder 360 are all active (enabled) while V.34 modem 300 is operating in steady state communications state 202. In contrast, and as shown in FIG. 4, a substantial portion of receive path structures 302 are disabled while V.34 modem 300 is operating in doze state 204. The set of disabled receive path structures 400 is exemplary and implementations of V.34 modem 300 wherein larger, smaller, or different sets of receive path structures are disabled during doze state 204 are also suitable. For example, individual receive path structures disabled during doze state 204 in the embodiment of FIG. 4, may instead remain enabled in alternative embodiments, though at the cost of additional computational load. Furthermore, receive path structures which remain enabled during doze state 204 in the embodiment of FIG. 4, may be disabled in alternative embodiments. For example, clock recovery module 384 and receive signal interpolator 385 may be disabled during doze state 204, though clock phase will need to be reacquired on transitions from doze state 204 to steady state communications state 202 via rate renegotiation state 205 or retrain state 210. Some or all of S signal detector 386, A/B signal detector 387, automatic gain control 389, power measurement module 388, and preliminary echo canceller 390 may be disabled during doze state 204, though degrading or eliminating the ability of V.34 modem 300 to detect remote wake up events (e.g., remote retrain, remote rate renegotiation, and remote cleardown) and appropriately respond thereto.

Receive front end module 380 receives the output of the A/D converter 392 as an input. A/D converter 392 couples to transmission line 395. Preliminary echo canceller 390 is implemented as a real data/real coefficients adaptive filter using any suitable filter implementation. In the steady state and doze state embodiments of FIGS. 3 and 4, preliminary echo canceller 390 receives as an input a white signal from the output of the modulator 330. Preliminary echo canceller 390 uses a stochastic gradient updating algorithm for adaptation during half duplex of V.34 training and is not updated during data mode. This preliminary stage of echo cancellation reduces echo level relative to the receive signal level so that subsequent stages such as clock recovery, signal detection, and automatic gain control (each not shown) will not be significantly affected by the echo. Preliminary echo canceller 390 remains enabled during doze state 204, allowing S signal detector 386 and A/B signal detector 387 to detect remote retrain, remote rate renegotiation, and remote cleardown requests from the remote modem during doze state 204 and trigger wake up events in correspondence therewith. Alternative embodiments may provide distinct near- and far-end preliminary echo canceller structures. S signal detector 386 is employed to detect S-to-$\overline{\text{S}}$ transitions indicative of rate renegotiation and cleardown requests as described in ITU-T Recommendation V.34, §§ 11.6-7 of which are hereby incorporated by reference. Similarly, A/B signal detector 387 is employed to detect tone A (if V.34 modem 300 is the call modem) or tone B (if V.34 modem 300 is the answer modem) indicative of retrain requests as described in ITU-T Recommendation V.34, § 11.5 of which is hereby incorporated by reference.

Receive path structures 302 implemented along the receive data path should be synchronized with the remote modem signal. In the exemplary embodiment of FIGS. 3 and 4, an adaptive FIR filter is used to perform the interpolation. Adaptive FIR filters implemented in any suitable manner (including DSP and general purpose processor alternatives described above) are used to interpolate the receive signal (at receive signal interpolator 385) as well as to interpolate delayed and undelayed versions of the modulator output (at far-end echo interpolator 383 and near-end echo interpolator 381) used as inputs for corresponding far- and near-end main echo cancellers 373 and 374. The filter coefficients are adjusted based on timing phase and frequency recovered from the remote modem signal by clock recovery module 384. The adaptation algorithm is performed by a two-stage combination of a poly-phase filter and linear interpolations. Persons of ordinary skill in the art will appreciate a variety of suitable implementations of poly-phase filters, as well as alternative adaptation algorithms. In the exemplary embodiment of FIG. 4, both clock recovery module 384 and receive signal interpolator 385 are included in the undisabled set of receive-path structures 209. In this way, synchronization with the remote mode clock is maintained even in doze mode. However, alternative embodiments may optionally include clock recovery module 384 and receive signal interpolator 385 in the set of disabled receive path structures 400, though clock phase will need to be reacquired on transitions from doze state 204 to steady state communications state 204 via rate renegotiation state 205 or retrain state 210.

Demodulator 372, a corresponding inverse structure (demodulator$^{-1}$ 371), and decoder 360 provide a feedback loop for adaptive updates to the coefficients defining main near-end echo canceller 373, main far-end echo canceller 374, and equalizer 375. V.34 modem 300 may optionally include a phase locked loop to compensate for frequency offset and phase jitter on transmission line 395. Regarding demodulation and channel impairment compensation module 370, a variety of alternative echo canceller and equalizer configurations are suitable. Several such configurations are described in greater detail in U.S. Pat. No. 5,864,545 entitled, "System and Method for improving Convergence During Modem Training and Reducing Computational Load During Steady-State Modem Operations," naming Gonikberg and Liang as inventors and filed on Dec. 6, 1996, the entirety of which is hereby incorporated by reference.

Decoder 360 converts the demodulated complex symbols into a bit stream which is supplied to receiver process 397. Transmit process 396 and receiver process 397 may be the same process. Decoder 360 performs nonlinear decoding, linear prediction, trellis decoding, constellation decoding, shell demapping, and data de-framing, all as described in respective sections of the V.34 recommendation, which is incorporated herein by reference. Persons of ordinary skill in the art will recognize variety of alternative implementations of decoder 360 in accordance with the requirements the V.34 recommendation. In addition, persons of ordinary skill in the art will recognize a variety of alternative configurations of decoder 360 suitable to modem implementations in accordance with other communications standards such as V.32, V.32bis, etc.

Referring now to the transmit data path of V.34 modem 300, transmit process 396 supplies a bit stream to a V.34 implementation of encoder 320. Encoder 320 converts the input bit stream into a baseband sequence of complex symbols which is used as input to modulator 330. Encoder 320 performs shell mapping, differential encoding, constellation mapping, precoding and 4D trellis encoding, and nonlinear encoding, all as described in respective sections of ITU-T Recommendation V.34, §§ 9.1-9.7 of which are hereby incorporated by reference.

Modulator 330 converts the baseband sequence of complex symbols from the output of the encoder into a passband sequence of real samples. In particular, modulator 330:

1. multiplies the complex baseband sequence by the carrier frequency; and
2. converts the complex signal to real.

If the spectrum of the modulator output is sufficiently white, it can be used as an input to receiver echo cancellers, as described below.

Shaping and pre-emphasis filter 341 provides square-root-of-raised-cosine shaping as well as pre-emphasis filtering specified by section 5.4 of the V.34 recommendation, which is incorporated herein by reference. Square-root raised cosine complex shaping and pre-emphasis filtering are implemented using any suitable filter implementation. The output of shaping and pre-emphasis filter 341 is an output of the transmitter portion of V.34 modem 300 is provided to D/A converter 391. D/A converter 391 couples to transmission line 395.

Transitions between steady state communications state 202 and doze state 204 are performed as described below. It is important that the remote modem not go into a hang-up state, because re-dialing is very time consuming. To put the modem in doze state 204, for example, when no TCP/IP sessions are open and there is no data to be received, while avoiding a remote modem hang up:

1. application or operating system program 206 makes a doze request using StartModemDoze ( ) function defined by an application program interface (API), for example, by a software modem API;
2. the modem transitions to doze state 204 by setting a flag to signal transition to doze state 204, and
3. in response to the set state of the flag,
   a) disabling the echo canceller input interpolation, i.e., far-end echo interpolator 383 and near-end echo interpolator 381, and
   b) placing demodulation and channel impairment compensation module 370 in idle mode (during which no more symbols will be demodulated).

In an exemplary embodiment, decoder module 360 and receive data module 350 are also not executed during doze state 204 because data flows from idled demodulation and channel impairment compensation module 370 are halted. However, alternative embodiments may specifically disable or idle decoder module 360 and receive data module 350.

To return from doze state 204 back to steady state communications state 202, for example when the user or an application or operating system program requests data to be transmitted again, for example by the user selecting a URL to get a new web page, disabled receive path structures 400 are re-enabled as follows:

1. application or operating system program 206 makes a doze request using NoDoze ( ) function defined by an API,
2. the modem transitions from doze state 204 back to steady state communications state 202 via renegotiation state 205 by:
   a) re-enabling echo canceller input interpolation, i.e., far-end echo interpolator 383 and near-end echo interpolator 381,
   b) placing the demodulation and channel impairment compensation module 370 in active mode, and
   c) initiating a rate renegotiation procedure with the remote modem in accordance with the requirements of ITU-T Recommendation V.34 to re-synchronize quickly.

Transitions from doze state 204 back to steady state communications state 202 which are triggered by a wake up event from the remote modem or by a local wake up analogously re-enable disabled receive path structures 400 by steps a, b, and c (above). In addition, transitions from doze state 204 back to steady state communications state 202 via retrain state 210 and triggered by a wake up event from the remote modem analogously re-enable disabled receive path structures 400 by steps a and b (above), together with step c' as follows:

c') initiating a retrain procedure with the remote modem in accordance with the requirements of ITU-T Recommendation V.34.

In an exemplary software embodiment, V.34 modem 300 includes an efficient general purpose processor implementation of an FIR filter as described in greater detail in U.S. patent application Ser. No. 08/748,854 entitled "Efficient Implementation of An FIR Filter on a General Purpose Processor," naming Gonikberg and Liang as inventors and filed Nov. 14, 1996, the entirety of which is hereby incorporated by reference. Along the transmit data path, pre-emphasis and shaping filter 341 is implemented using such an FIR filter implementation. Along the receive data path, echo interpolators 381 and 383, receive signal interpolator 385, preliminary echo canceller 390, main near- and far-end echo cancellers 373 and 374, and equalizer 375 are also implemented using such an FIR filter.

Other Embodiments

Figure 5:
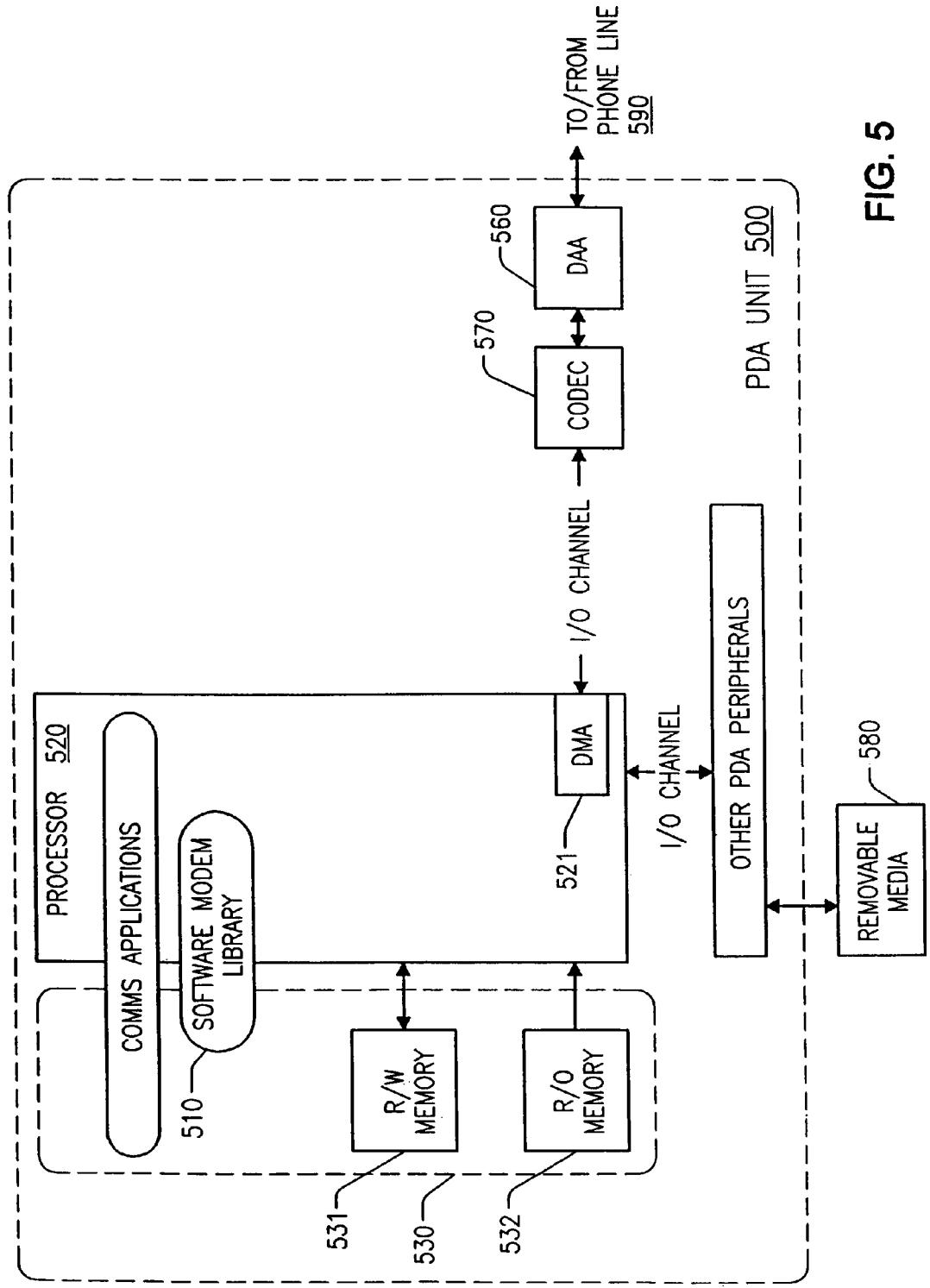
FIG. 5 is a block diagram of an exemplary Personal Digital Assistant (PDA) system embodiment including a general purpose processor, registers, and memory for executing a software implementation of a modem such as that depicted in FIGS. 3 and 4.

FIG. 5 depicts a Personal Digital Assistant (PDA) 500 incorporating a software modem library 510 including modules providing a software implementation of a V.34 modem 300). In a such an embodiment, execution of code associated with an undisabled subset of receive path structures 302 is selectively enabled and disabled in accordance with transitions in V.34 modem 300 state from steady state communications state 202 to doze state 204 and back to steady state communications state 202.

Input signal vectors and filter coefficient vectors suitable for providing the various filter implementations of interpolators, phase splitting filters, linear predictors, etc. (which have been described above with reference to FIGS. 3 and 4) are loaded from memory 530 and output signal vectors are stored to memory 530. In addition, executable instructions implementing the software modem library 510 (including implementations of transmit path structures 301 and receive path structures 302) and suitable for execution on general purpose processor 520 are also stored in, and loaded from, memory 530.

In an exemplary embodiment, general purpose processor 520 includes a MIPS R3000 RISC microprocessor, although a wide variety of alternative processor implementations are also suitable, including, for example, R4000 and RS000 processors, processors conforming to the Sparc, PowerPC, Alpha, PA-RISC, or x86 processor architectures, etc. General purpose processor 520 includes a DMA channel 521 for interfacing to telecommunication circuits (illustratively, phone line 590) via codec 570 and Digital-to-Analog/Analog-to-Digital (DAA) converter 560. Of course, memory 530 may include either read/write memory 531 or read/write memory 531 in combination with read-only memory 532. Persons of ordinary skill in the art will recognize a variety of suitable allocations of code and data to each. Removable media 580 provides a mechanism for supplying the executable instructions implementing software modem library 510.

While the invention has been described with reference to various embodiments, it will be understood that these embodiments are illustrative and that the scope of the invention is not limited to them. Many variations, modifications, additions, and improvements of the embodiments described are possible and may fall within the scope of the invention as defined by the claims which follow.

What is claimed is:
1. A method comprising:
   closing a communications session opened over a communications connection;
   disabling a substantial portion of communications receive path tasks performed by a processing unit while maintaining the communications connection; and
   while the substantial portion of receive path tasks are disabled, the processing unit performing at least one non-communications function; and
   re-enabling at least a subset of the disabled communications receive path tasks responsive to a wake-up event.
2. The method of claim 1, wherein the communications connection includes a modem connection.
3. The method of claim 1, wherein the communications session is in accordance with at least one of transmission control protocol, internet protocol, Appletalk® protocol, IPX dialup, ZMODEM, and hypertext transfer protocol.

4. The method of claim 1, wherein maintaining the communications connection comprises maintaining at least one transmit path task.

5. The method of claim 4, wherein the transmit path task includes propagating a signal over the communications connection.

6. The method of claim 4, wherein maintaining the communications connection further comprises maintaining an undisabled set of receive path tasks.

7. The method of claim 6, wherein the undisabled set of receive path tasks includes at least one of detecting high level requests from a remote device, echo cancellation, and remote clock recovery.

8. The method of claim 7, wherein the high level requests include remote retrain, remote rate negotiation, and remote cleardown.

9. The method of claim 1, wherein the wake-up event includes a local wake-up event or a remote wake-up event.

10. The method of claim 9, wherein the local wake-up event is driven by an application or a user.

11. The method of claim 1, wherein the wake-up event is periodic.

12. The method of claim 11, wherein the periodic wake-up event is driven by polling.

13. A modem comprising:
a communications interface operable to transmit communication signals and to receive communication signals; and
a machine-readable media having instructions stored thereon, the instructions executable to,
establish a communications connection via the communications interface,
close any communications sessions over the established communications connection;
disable a substantial portion of receive path tasks for the established communications connection, and
re-enable at least a subset of the disabled receive path tasks in response to a wake-up event, wherein the receive path tasks process data of the communication signals.

14. The modem of claim 13, wherein the communications connection includes a modem connection in accordance with a low level communications protocol.

15. The modem of claim 14, wherein the low level communications protocol includes at least one of a physical layer communications protocol and a data link layer communications protocol.

16. The modem of claim 13, wherein the communications session is in accordance with at least one of transmission control protocol, internet protocol, Appletalk® protocol, IPX dialup, ZMODEM, and hypertext transfer protocol.

17. The modem of claim 13 further comprising a digital/analog converter coupled with the communications interface.

18. The modem of claim 13, wherein the communication signals include one or more of wireless signals, analog signals, digital signals, and optical signals.

19. The modem of claim 13, wherein the wake-up event includes a local wake-up event or a remote wake-up event.

20. The modem of claim 19, wherein the remote wake-up event includes a retrain event, a rate renegotiation event, or a remote cleardown event.

21. The modem of claim 13 further comprising the instructions executable to perform digital signal processing.

22. The modem of claim 13 further comprising a processing unit to execute the instructions.

23. A computer program product encoded on one or more machine-readable media executed by a processor to perform:
defining transmit path tasks maintain an established communications connection, wherein previously opened communications sessions over the established communications connection have been closed; and
defining receive path tasks to disable a portion of the receive path tasks to reduce computational load imposed on a processor by the portion of the receive path tasks.

24. The computer program product of claim 23, wherein the communications connection includes a modem connection.

25. The computer program product of claim 23, wherein the communications sessions are in accordance with at least one of transmission control protocol, internet protocol, Appletalk® protocol, IPX dialup, ZMODEM, and hypertext transfer protocol.

26. The computer program product of claim 23, wherein the processor performs output modulation to maintain the established connection.

27. The computer program product of claim 23, wherein the processor disables the portion of the receive path tasks in response to at least one of an idle timeout and a doze request.

28. The computer program product of claim 23, wherein the undisabled portion of the receive path tasks include echo cancellation and detection of high level requests.

29. An apparatus comprising:
a processor;
means for closing a communications session opened over a communications connection;
means for disabling a substantial portion of communications receive path tasks performed by the processor while maintaining the communications connection; and
while the substantial portion of receive path tasks are disabled, the processor performing at least one non-communications function; and
means for re-enabling at least a subset of the disabled communications receive path tasks responsive to a wake-up event.

30. The apparatus of claim 29, wherein the communications connection includes a modem connection and the communications sessions are in accordance with at least one of transmission control protocol, internet protocol, Appletalk® protocol, IPX dialup, ZMODEM, and hypertext transfer protocol.

31. The apparatus of claim 29 further comprising means for opening communications sessions on the maintained communications connection.

* * * * *

UNITED STATES PATENT AND TRADEMARK OFFICE
CERTIFICATE OF CORRECTION

PATENT NO. : 7,383,549 B1
APPLICATION NO. : 10/889611
DATED : June 3, 2008
INVENTOR(S) : Zarko Draganic It is certified that error appears in the above-identified patent and that said Letters Patent is hereby corrected as shown below:

Column 12:
In claim 23, line 4, after "tasks" insert --to--.

Signed and Sealed this

Twenty-sixth Day of August, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,383,549 B1 | Page 1 of 1 |
| APPLICATION NO. | : 10/889611 | |
| DATED | : June 3, 2008 | |
| INVENTOR(S) | : Zarko Draganic | |

It is certified that error appears in the above-identified patent and that said Letters Patent is hereby corrected as shown below:

Column 12:
    In claim 23, line 11, after "tasks" insert --to--.

This certificate supersedes the Certificate of Correction issued August 26, 2008.

Signed and Sealed this

Twenty-third Day of September, 2008

JON W. DUDAS
*Director of the United States Patent and Trademark Office*